United States Patent
Tiirola et al.

(10) Patent No.: US 12,082,248 B2
(45) Date of Patent: Sep. 3, 2024

(54) CHANNEL SENSING TECHNIQUES FOR WIRELESS NETWORKS

(71) Applicant: NOKIA TECHNOLOGIES OY, Espoo (FI)

(72) Inventors: Esa Tiirola, Oulu (FI); Kari Hooli, Oulu (FI); Karol Schober, Helsinki (FI); Timo Lunttila, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 371 days.

(21) Appl. No.: 17/753,049

(22) PCT Filed: Sep. 4, 2019

(86) PCT No.: PCT/FI2019/050628
§ 371 (c)(1),
(2) Date: Feb. 16, 2022

(87) PCT Pub. No.: WO2021/044075
PCT Pub. Date: Mar. 11, 2021

(65) Prior Publication Data
US 2022/0287088 A1 Sep. 8, 2022

(51) Int. Cl.
*H04W 74/0808* (2024.01)

(52) U.S. Cl.
CPC .............................. *H04W 74/0808* (2013.01)

(58) Field of Classification Search
None
See application file for complete search history.

(56) References Cited

U.S. PATENT DOCUMENTS 8,593,983 B2 * 11/2013 Barr ..................... H04W 72/542
370/252
8,665,692 B2 * 3/2014 Koivisto ................ H04B 17/24
370/204

(Continued)

OTHER PUBLICATIONS

International Search Report and Written Opinion for International Application No. PCT/FI2019/050628, mailed on Jun. 4, 2020, 13 pages.

(Continued)

*Primary Examiner* — Brian S Roberts
(74) *Attorney, Agent, or Firm* — Robert P. Michal, Esq.; Carter, DeLuca & Farrell LLP

(57) ABSTRACT

According to an example embodiment, a method may include determining, by a wireless node in a cell, a silent resource pattern for each of a plurality of signal waveform types including at least a single carrier waveform type and a multicarrier waveform type, wherein each silent resource pattern identifies one or more resource elements that are indicated as unused by at least one node of the cell for the signal waveform type; determining, by the wireless node, whether a signal waveform type, of the plurality of signal waveform types, for channel sensing is known by the wireless node; performing, by the wireless node if a signal waveform type for channel sensing is known by the wireless node, channel sensing based on a silent resource pattern for a known signal waveform type for channel sensing of the plurality of signal waveform types; and otherwise, performing, by the wireless node if the signal wave form type for channel sensing is not known by the wireless node, channel sensing based on a silent resource pattern for each of a plurality of the signal waveform types.

19 Claims, 8 Drawing Sheets

(56) References Cited

U.S. PATENT DOCUMENTS

| | | |
|---|---|---|
| 2011/0182199 A1 | 7/2011 | Barr |
| 2012/0155291 A1 | 6/2012 | Koivisto et al. |
| 2015/0381291 A1 | 12/2015 | Mahajan et al. |
| 2021/0149016 A1* | 5/2021 | Murakami .............. G01S 13/42 |

OTHER PUBLICATIONS

5G Americas White Paper: Advanced Antenna Systems for 5G; Aug. 2019; 59 pages.
3GPP TSG RAN Meeting #79, RP-180453; "New SID on NR waveform beyond 52.6GHz"; Chennai, India; Mar. 19-22, 2019; 4 pages.
3GPP TSG RAN Meeting #79, RP-180320; "New SID: Study on NR design above 52.6GHz"; Chennai, India; Mar. 19-22, 2019; 4 pages.
European Search Report for Application No. 19944194.0, mailed on May 8, 2023, 7 pages.
3GPP TSG RAN WG1 Meeting #86bis, R1-1609185; "Considerations on the Co-Channel Coexistence of Multiple RATs for V2X"; Agenda Item: 7.2.1.3; Source: LG Electronics; Oct. 10-14, 2016; 8 pages.
3GPP TSG RAN WG1 Meeting #98, R1-1908205; "Discussion on Channel Access Procedure for NR-U"; Source: ZTE, Sanechips; Agenda Item: 7.2.2.2.1; Aug. 26-30, 2019; 14 pages.

* cited by examiner

CHANNEL SENSING TECHNIQUES FOR WIRELESS NETWORKS

CROSS-REFERENCE TO RELATED APPLICATIONS

This application is a national stage entry of International Application No. PCT/FI2019/050628, filed Sep. 4, 2019, entitled "CHANNEL SENSING TECHNIQUES FOR WIRELESS NETWORKS" which is hereby incorporated by reference in its entirety.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the $3^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a method may include: determining, by a wireless node in a cell, a silent resource pattern for each of a plurality of signal waveform types including at least a single carrier waveform type and a multicarrier waveform type, wherein each silent resource pattern identifies one or more resource elements that are indicated as unused by at least one node of the cell for the signal waveform type; determining, by the wireless node, whether a signal waveform type, of the plurality of signal waveform types, for channel sensing is known by the wireless node; performing, by the wireless node if a signal waveform type for channel sensing is known by the wireless node, channel sensing based on a silent resource pattern for a known signal waveform type for channel sensing of the plurality of signal waveform types; otherwise, performing, by the wireless node if the signal waveform type for channel sensing is not known by the wireless node, channel sensing based on a silent resource pattern for each of a plurality of the signal waveform types.

According to an example embodiment, an apparatus may include means for determining, by a wireless node in a cell, a silent resource pattern for each of a plurality of signal waveform types including at least a single carrier waveform type and a multicarrier waveform type, wherein each silent resource pattern identifies one or more resource elements that are indicated as unused by at least one node of the cell for the signal waveform type; means for determining, by the wireless node, whether a signal waveform type, of the plurality of signal waveform types, for channel sensing is known by the wireless node; means for performing, by the wireless node if a signal waveform type for channel sensing is known by the wireless node, channel sensing based on a silent resource pattern for a known signal waveform type for channel sensing of the plurality of signal waveform types; means for otherwise, performing, by the wireless node if the signal waveform type for channel sensing is not known by the wireless node, channel sensing based on a silent resource pattern for each of a plurality of the signal waveform types.

According to an example embodiment, an apparatus may include: at least one processor; and at least one memory including computer program code; the at least one memory and the computer program code configured to, with the at least one processor, cause the apparatus at least to: determine, by a wireless node in a cell, a silent resource pattern for each of a plurality of signal waveform types including at least a single carrier waveform type and a multicarrier waveform type, wherein each silent resource pattern identifies one or more resource elements that are indicated as unused by at least one node of the cell for the signal waveform type; determine, by the wireless node, whether a signal waveform type, of the plurality of signal waveform types, for channel sensing is known by the wireless node; perform, by the wireless node if a signal waveform type for channel sensing is known by the wireless node, channel sensing based on a silent resource pattern for a known signal waveform type for channel sensing of the plurality of signal waveform types; otherwise, perform, by the wireless node if the signal waveform type for channel sensing is not known by the wireless node, channel sensing based on a silent resource pattern for each of a plurality of the signal waveform types.

According to an example embodiment, a non-transitory computer-readable storage medium comprising instructions stored thereon that, when executed by at least one processor, are configured to cause a computing system to perform a method of: determining, by a wireless node in a cell, a silent resource pattern for each of a plurality of signal waveform types including at least a single carrier waveform type and a multicarrier waveform type, wherein each silent resource pattern identifies one or more resource elements that are indicated as unused by at least one node of the cell for the signal waveform type; determining, by the wireless node, whether a signal waveform type, of the plurality of signal waveform types, for channel sensing is known by the wireless node; performing, by the wireless node if a signal waveform type for channel sensing is known by the wireless node, channel sensing based on a silent resource pattern for a known signal waveform type for channel sensing of the plurality of signal waveform types; otherwise, performing, by the wireless node if the signal waveform type for channel sensing is not known by the wireless node, channel sensing based on a silent resource pattern for each of a plurality of the signal waveform types.

The details of one or more examples of embodiments are set forth in the accompanying drawings and the description below. Other features will be apparent from the description and drawings, and from the claims.

DETAILED DESCRIPTION

Figure 1:
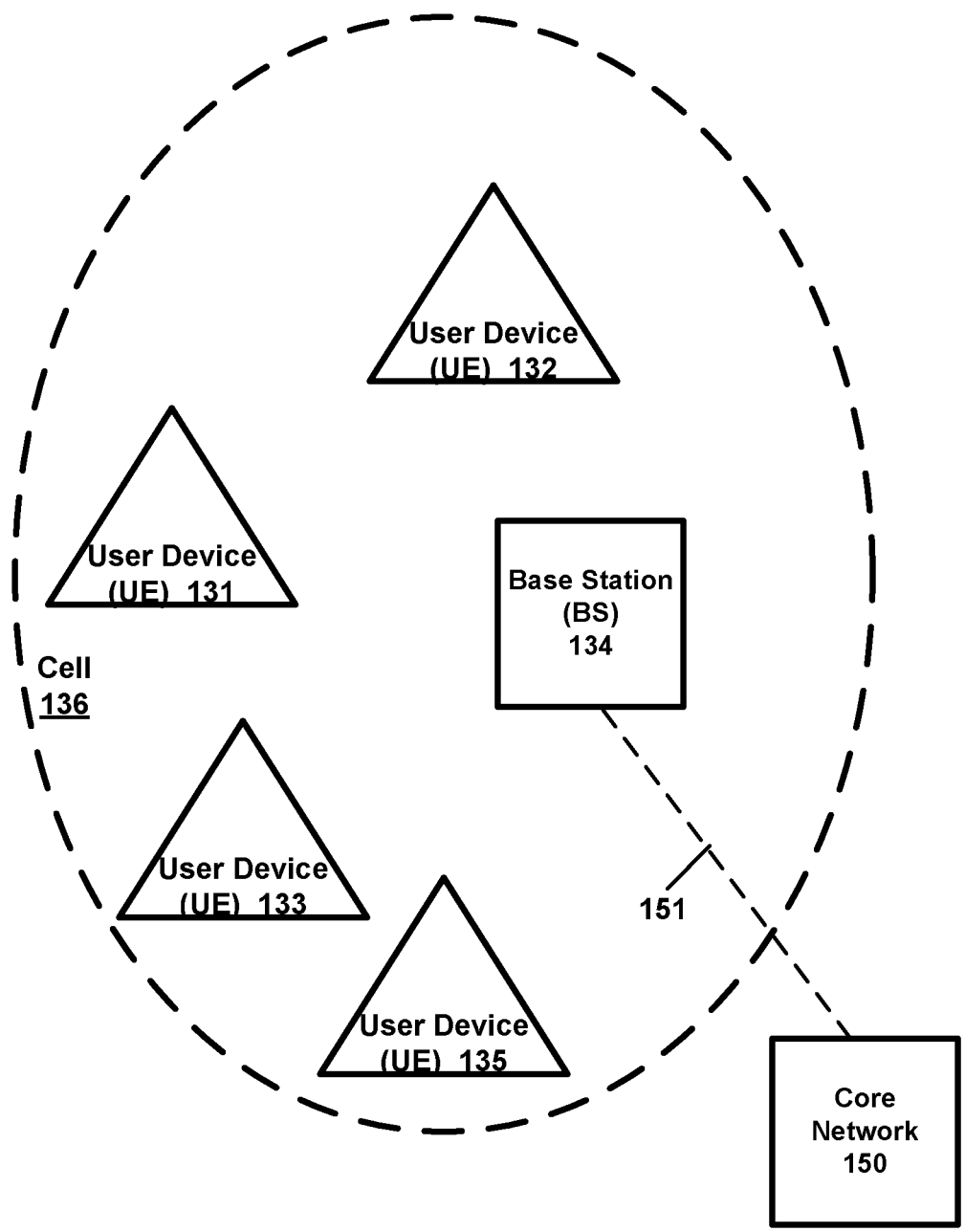
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a BS, next generation Node B (gNB), a next generation enhanced Node B (ng-eNB), or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS). At least part of the functionalities of a BS (e.g., access point (AP), base station (BS) or (e)Node B (eNB), BS, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface or NG interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a centralized unit (CU) and/or a distributed unit (DU) in the case of a split BS or split gNB), or other network node.

According to an illustrative example, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node (e.g., BS, eNB, gNB, CU/DU, . . . ) may forward data to the UE that is received from a network or the core network, and/or forward data received from the UE to the network or core network. RAN nodes (e.g., BS, eNB, gNB, CU/DU, . . . ) may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform. A base station may also be DU (Distributed Unit) part of IAB (Integrated Access and Backhaul) node (a.k.a. a relay node). DU facilitates the access link connection(s) for an IAB node.

A user device (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. A user device may be also MT (Mobile Termination) part of IAB (Integrated Access and Backhaul) node (a.k.a. a relay node). MT facilitates the backhaul connection for an IAB node.

According to an example embodiment a wireless node may include or may refer to a user equipment (UE) or user device, a gNB, an eNB, a base station (BS), a relay node, or other wireless node.

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network.

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)—related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to a eMBB UE (or an eMBB application running on a UE).

The various example embodiments may be applied to a wide variety of wireless technologies or wireless networks, such as LTE, LTE-A, 5G (New Radio (NR)), cmWave, and/or mmWave band networks, IoT, MTC, eMTC, eMBB, URLLC, etc., or any other wireless network or wireless technology. These example networks, technologies or data service types are provided only as illustrative examples.

A wireless node (e.g., UE, BS, gNB, or other wireless device or node) may transmit and receive one or more signal waveform types. Two general signal waveform types may include, e.g., a single carrier waveform type (e.g., which may use a single carrier) and a multicarrier waveform type (e.g., which may include use of multiple carriers). Some example single carrier waveforms may include, e.g., a Single Carrier Frequency Division Multiplexing (SCFDM) waveform, a Cyclic Prefix (CP) Discrete Fourier Transform (DFT)-Spread-Orthogonal Frequency Division Multiplexing (CP DFT-S-OFDM) waveform, and a Zero-Tail DFT-Spread-OFDM waveform (ZT DFT-S-OFDM). Some example multicarrier waveforms may include, e.g., Cyclic Prefix OFDM (CP-OFDM), and unique word (UW) OFDM. These are merely illustrative examples, and other signal waveform types may be used. According to an example embodiment, single carrier signal waveforms and multicarrier signal waveforms may offer different advantages and trade-offs. For example, single carrier (SC) may provide a lower peak-to-average power ratio (PAPR), thus allowing power amplifiers to operate at higher power. On the other hand, multicarrier signal waveforms (e.g., CP-OFDM) may offer a higher spectral efficiency at higher modulation and coding schemes (MCSs).

The next generations or releases of systems optimized for high frequencies, e.g., above 52.6 GHz (as an illustrative example), may have to cope with increased path loss, larger antenna arrays, and less efficient RF (radio frequency) components like power amplifiers (PAs). Hence, at least in some cases, the systems operating at higher frequencies may be more noise limited especially at a cell edge which will drive the need to obtain more power from the power amplifiers (PAs). According to an example embodiment, in some situations, single carrier (SC) waveforms may be preferred over multicarrier waveforms because of its low peak to average power ratio (PAPR) properties for the single carrier waveform. The low PAPR provided by a single carrier waveform enables the power amplifiers (PAs) to be run at a higher power which may maintain or extend cell coverage, e.g., to provide signal transmissions with sufficient power to reach UEs located at the cell edge. However, as noted above, multicarrier signal waveforms may be still beneficial for cell-center UEs, e.g. due to higher spectral efficiency at high MCS and/or MIMO order for the same receiver complexity. The PA (power amplifier) efficiency may also be important, at least in some cases, for downlink (DL) transmissions due to large antenna arrays and the limitations on the component technology. Thus, for example, a single carrier waveform may be useful or favored in certain situations or for certain UEs (e.g., such as to transmit to and from UEs located at the cell edge so as to maximize signal power or range), while legacy multicarrier waveform types may be used or favored in other situations (e.g., such as for UEs located closer to the gNB to provide high throughput for UEs in favorable radio propagation conditions). These are merely some illustrative examples of where single carrier and multicarrier waveform types may be used or favored, and other examples or situations may be used. Thus, it may be advantageous for UEs, gNBs (and possibly other wireless nodes) to support multiple signal waveform types, including supporting both a single carrier waveform type and a multicarrier waveform type.

Also, according to an example embodiment, a wireless node (e.g., UE or gNB) may transmit different signal waveform types for uplink (UL) transmissions and for downlink (DL) transmissions. Also, according to an example embodiment, the signal waveform type may change each slot, or even each symbol, for DL and/or UL transmissions. For example, a gNB may transmit a first symbol (or first set of symbols) via a multicarrier waveform to a first UE that is located close or near to the gNB. Then the gNB may transmit a second symbol (or second set of symbols) via a single carrier waveform to a second UE that is located at the cell edge (further away from the gNB than the first UE). In this manner, the gNB may transmit signals over time using different signal waveform types. Likewise, various UEs in a cell may transmit and/or receive using different signal waveform types, e.g., for different slots, different channel occupancy times, different symbols, or for other resources or time periods.

According to an example embodiment, various wireless nodes (e.g., UEs, BSs, gNBs, eNBs) may be operating within wireless networks that may use radio (wireless) spectrum that is shared by multiple radio access technologies (RATs). For example, one or more gNBs and multiple UEs of 5G/New Radio (and/or LTE) radio access technology (RAT) may share wireless spectrum with one or more WiFi networks (e.g., WiFi Access Points or base stations, and WiFi clients or Wi-Fi UEs). In some cases, for example, operation in unlicensed spectrum may be regulated by the certain channel access rules that target fair spectrum usage among different RATs on the same shared unlicensed spectrum. The rules may require for example, at least in some cases, e.g., that wireless nodes should perform channel sensing, which may also be referred to as listen-before-talk (LBT) or channel access, before transmitting on the channel. Channel sensing may include, for example, sensing whether a channel is occupied (or not) by another wireless device or wireless node. Channel sensing may include, for example, detecting an energy level of a channel, and comparing the detected energy level to a threshold, where an energy level less than or equal to the threshold indicates that the channel is unoccupied (and may be used or transmitted on), while an energy level greater than the threshold may indicate that the channel is occupied (e.g., indicating that another device is transmitting on the channel). Also, according to an example embodiment, in a beam-based operation, channel sensing or LBT (listen before talk) may likely be performed in the intended transmit direction, e.g., the transmitter (transmitting device or node) may perform channel sensing or LBT using the beam it intends to use for the scheduled/planned transmission. Thus, channel sensing may be performed per beam or in a directional manner, for example. Thus, a device or wireless node may apply a receive beam for channel sensing and then apply the same beam as a transmit beam to transmit a signal if the channel is unoccupied, as an illustrative example. Also, for example, a signal transmission may be performed via a beam pair, including a transmit beam applied at a transmitting wireless node, and a receive beam applied at a receiving wireless node. Also, for example, channel sensing may be performed using the same beam pair (which may be referred to as a beam pair link), although the transmitting wireless node may use its beam as a receive beam to perform channel sensing.

According to an example embodiment, channel sensing may be performed under different circumstances. For example, channel sensing may be performed when the wireless node is not receiving a signal. However, according to an example embodiment, to improve channel sensing performance, channel sensing may also be performed when the wireless node is receiving a signal (e.g., a signal has been transmitted in a direction towards the wireless node that is performing channel sensing). In other words, there may be two different channel sensing types:

Type 1: channel sensing is performed while the sensing gNB/UE is not receiving a transmission for the given beam pair link (e.g., where the beam pair link may include a transmit beam for a transmitting node, and a receive beam for a receiving/sensing node).

Type 2: channel sensing while the sensing gNB/UE is receiving a transmission, e.g., receiving a signal for the given beam pair link.

In some cases, a wireless node may not be able to do Type 1 channel sensing before transmitting or attempting to transmit (e.g., due to presence of a signal at the sending node). In that case, the wireless node may perform Type 2 channel sensing, before transmission to decrease a possibility of collisions on a channel and improve efficiency.

Channel sensing may involve, for example, sensing interfering signals that are being transmitted from one or more other nodes (e.g., signals from nodes of the current cell, signals from nodes of other or different cells, and/or signals from nodes of different RATs). According to an example embodiment, in some situations or for some networks (e.g., such as for unlicensed band usage), interference from a transmitting node may be of several types: intra-cell interference (e.g., signals transmitted from other nodes within the cell); inter-cell interference (e.g., signals transmitted from wireless nodes of other cells of same RAT, e.g., from other UEs or gNBs of a 5G/NR cell); and inter-RAT interference (e.g., signals transmitted by wireless nodes of other RATs, such as by Wi-Fi APs or Wi-Fi UEs/clients). At least in some cases, intra-cell interference may not be a problem, since the gNB typically coordinates the uplink and downlink transmission schedules so as to avoid collisions. Thus, according to an example embodiment, e.g., to perform Type 2 channel sensing (channel sensing while the sensing gNB/UE is receiving a transmission) it may be desirable for a wireless node to perform channel sensing to detect both inter-cell signals/interference and inter-RAT signals/interference, while ignoring (or omitting) intra-cell signals. This is because, when the wireless node of a cell transmits or is scheduled by a gNB to transmit, the wireless node may typically not receive interference from other wireless nodes (e.g., UEs or the gNB) within the cell, because those transmissions within the cell may typically be coordinated by the gNB to avoid collisions within the cell. However, signals/interference (interfering signals) may be received by the wireless node from other/neighbor cells of the same RAT (inter-cell interference, such as from another 5G/NR cell(s)) and interference from wireless nodes of other radio access technologies (from other RATs, such as from Wi-Fi wireless nodes), since these transmissions may not typically be coordinated with the transmissions of the current cell to avoid interference.

Therefore, according to an example embodiment, it may be advantageous for a wireless node to perform channel sensing when other wireless nodes (e.g., gNB and/or other UEs within 5G/NR cell) are not transmitting, e.g., in order to obtain a true or correct sense of whether there is any inter-cell or inter-RAT signals on the channel. Therefore, according to an example embodiment, a wireless node (e.g., UE or gNB) of a cell may perform channel sensing when other wireless nodes (e.g., the gNB or a UE) of the cell are not transmitting. Otherwise, if the wireless node performs channel sensing while other wireless node(s) within the cell is transmitting, this may typically cause the detected energy from the channel sensing to be greater than the threshold, and thus, detected as occupied, even if there are no received inter-cell or inter-RAT signals. Thus, at least in some cases, performing channel sensing while the sending node receives a signal from another wireless node of the same cell (intra-cell interference), may render the channel sensing results inaccurate or even useless, due to the presence of the intra-cell signal transmission.

Therefore, according to an example embodiment, a wireless node may determine (e.g., in some cases, may receive) a silent resource pattern that identifies one or more resources or resource elements (REs, such as time-frequency resources) that are indicated as unused (e.g., silent, empty, or muted resources) by at least one wireless node of the cell. Thus, as an illustrative example, the silent resource pattern may identify silent (e.g., empty, unused, muted) gap(s) within a symbol, or within a group of symbols. Therefore, the silent resource pattern may identify unused (or empty) resources, e.g., which may be small time periods, or one or more subcarriers, for which a node (e.g., the gNB of the cell, or a UE scheduled for transmission on the symbol(s)) will be silent or muted (will not transmit during such silent gaps or during such unused or silent resources). For example, a wireless node that has been scheduled to transmit during such symbol (or group of symbols), would cease transmitting during those silent gaps or silent or unused resources within the symbol or group of symbols. Thus, the transmitting node (e.g., gNB or scheduled UE within the cell) would mute itself or temporarily cease transmitting during such silent gaps or silent resources of the symbol or group of symbols.

According to an example embodiment, a wireless node may perform channel sensing based on the silent resource pattern. For example, the wireless node may perform channel sensing during the empty (silent or muted) resources identified by the silent resource pattern, during one or more symbols. In this manner, the wireless node may perform channel sensing during one or more of these empty resources (or silent gaps or silent resources within the symbol or group of symbols), e.g., which may cause the channel sensing to omit (or avoid sensing or receiving) any intra-cell signal/interference, while detecting any energy on the channel due to inter-cell and inter-RAT signals. In this manner, channel sensing during silent resources (or silent gaps) indicated by the silent resource pattern may allow the sensing wireless node to obtain a more accurate indication of channel energy (interference level) caused by inter-cell signals and inter-RAT signals. This approach may be particularly useful, for example, for unlicensed band in which wireless nodes of a cell may be sharing the spectrum with wireless nodes of other RATs (such as Wi-Fi, for example).

As noted, it may be desirable for wireless nodes to support multiple or different signal waveform types, such as one or more single carrier waveform types, and one or more multicarrier waveform types, since UEs and/or a gNB may transmit and/or receive signals via each of these multiple signal waveform types. However, each of these signal waveform types may have a different structure of time-frequency resources (e.g., different symbol widths, different numbers of subcarriers, different subcarrier spacing, . . . ). Therefore, according to an example embodiment, each signal waveform type may have a different silent resource pattern, e.g., to identify unused (or empty) resources (silent gaps or silent resources), e.g., for one or more symbols, for that signal waveform type. For example, there may be a first silent resource pattern for a single carrier waveform type (e.g., identifying unused or silent resources within a single carrier waveform signal during one or more symbols), and a second silent resource pattern for a multicarrier waveform type (e.g., identifying unused or silent resources within a multicarrier waveform signal during one or more symbols), where each of these silent resource patterns may be different for different signal waveform types. In an example embodiment, there may be multiple different silent resource patterns for a single waveform type.

According to an example embodiment, a wireless node (e.g., UE or gNB) may know (e.g., may be notified) of a signal waveform type for a cell (e.g., an intra-cell signal waveform type that will be used for a signal transmission for the cell), e.g., for a symbol or a group of symbols. For example, a wireless node may be pre-configured with a signal waveform type that is used for a cell (e.g., for all symbols, or for one or more symbols, or for symbols of a specific time period). For example, a configured searchspace set or CORESET could be associated with a waveform type. Or a wireless node may receive control information indicating a signal waveform type that is used for signal transmission for a cell for the one or more symbols. For example, a gNB may indicate to a UE(s) a signal waveform type for an UL transmission or for a DL transmission. The signal waveform type may, for example, be indicated in control information associated with a downlink scheduling assignment (indicating the signal waveform type that will be used for that downlink transmission from gNB to UE), or indicated in control information associated with an uplink scheduling assignment/allocation to a UE (e.g., indicating the signal waveform type that will be used for that uplink signal transmission). In such case, the sensing wireless node may perform channel sensing based on a silent resource pattern for the indicated signal waveform type.

Thus, according to an example embodiment, if the wireless node knows (e.g., has determined, or has received information indicating) the signal waveform type for the cell for one or more symbols where channel sensing will be performed (e.g., to perform channel sensing within silent resources or silent gaps of such symbol(s)), then channel sensing may be performed based on the silent resource pattern of the known signal waveform type. This may allow the wireless node (e.g., UE or gNB) to allow channel sensing to be performed for inter-cell and inter-RAT signals, while omitting or avoiding sensing of the intra-cell signals/interference. For example, the sensing wireless node may determine whether or not the channel is occupied based on the detected energy level. The wireless node may be allowed to transmit on the channel if the channel is unoccupied. For example, the detected energy level of the channel may be compared to a threshold. If the detected energy level is less than or equal to the threshold, this may indicate the channel is unoccupied (and thus, the wireless node may transmit on the unoccupied channel). If the detected energy level is greater than the threshold, this may indicate that the channel is occupied, and the UE may then, e.g., perform one or more of: not transmit on the channel, transmit a signal on the channel using a reduced transmission power or using a reduced transmission duration, perform a backoff (e.g., wait for a random period of time) and retry channel sensing and then transmit if channel is then unoccupied, and/or send a signal to notify another wireless node that the channel is occupied.

However, according to an example embodiment, at least in some cases, the wireless node may not know (or may not have determined) the signal waveform type that will be used within the cell for transmission of one or more symbols where (when) the wireless node will perform channel sensing. According to an example embodiment, in that case, when the signal waveform type is unknown for one or more symbols where channel sensing will be performed, the wireless node may perform channel sensing based on a silent resource pattern for each of a plurality of signal waveform patterns (since the specific silent resource pattern that should be used is unknown). For example, if there is a single carrier silent resource pattern (to be used for channel sensing for a single carrier signal waveform type) and a multicarrier silent resource pattern (to be used for channel sending for a multicarrier signal waveform type), then the wireless node (e.g., UE or gNB) may (e.g., separately) perform channel sensing based on (e.g., during the indicated silent or empty resources) both (or each of) the single carrier silent resource pattern and the multicarrier silent resource pattern. The wireless node may determine the detected energy on the channel based on each of the plurality of silent resource patterns.

According to an example embodiment, among the channel sensings based on multiple silent resource patterns, the higher (or greater) detected energy on the channel may correspond to an intra-cell signal transmission during such channel sensing (during the silent resources of that silent resource pattern), while the lower detected energy of the channel may, for example, correspond to the situation where there is no intra-cell signal during the silent or empty resources. Thus, for example, the lower or lowest detected energy level may correspond to channel sensing using the correct silent resource pattern that matches the waveform type of any transmitted intra-cell signals during such sensing (e.g., channel sensing was performed during the silent or unused resources of the symbol, resulting in the lower or lowest energy level). Thus, according to an example embodiment, the lower detected energy (among the channel sensings performed based on the plurality of silent resource patterns for different signal waveform types) may be compared to a threshold. If the lower (or lowest) detected energy level is, for example, less than or equal to a threshold, this may indicate that the channel is unoccupied (and thus, the wireless node may then transmit on the unoccupied channel). If the lower (or lowest) detected energy level (among the channel sensings for each of the multiple silent resource patterns) is greater than the threshold, this may indicate that the channel is occupied. As noted, the wireless node may perform one or more actions if the channel is occupied, e.g., not transmit on the channel, transmit a signal on the channel using a reduced transmission power or using a reduced transmission duration, perform a backoff (or wait for a random period of time) and retry channel sensing and then transmit if channel is then unoccupied, and/or send a signal to notify another wireless node(s) that the channel is occupied.

According to an example embodiment, a wireless node (e.g., UE or gNB) may determine if there is an ongoing transmission, and then may select either Type 1 or Type 2 channel sensing. If the wireless node is not receiving a transmission, then the wireless node would perform Type 1 channel sensing, where there are no silent resources indicated by the silent resource pattern. If the wireless node is receiving a signal (e.g., from another node within the cell), then the wireless node performs Type 2 channel sensing, which according to an example embodiment, may include, e.g., performing channel sensing (during indicated silent or empty resources within a symbol(s) according to the silent resource pattern) while the sensing wireless node is receiving a signal during the symbol. According to an example embodiment, the intra-cell signal may be received other than the indicated silent or unused resources of the symbol. According to an example embodiment, the Type 2 channel sensing may be performed based on silent resource pattern for a signal waveform type(s), where the silent resource pattern may identify one or more resource elements (e.g., time portions of a symbol, and/or one or more subcarriers) that are indicated as unused (e.g., silent, muted or empty resources) by at least one node of the cell. In this manner, by performing channel sensing based on a silent resource pattern, the sensing wireless node may detect energy on a channel associated with (e.g., resulting from) inter-cell and inter-RAT signals or interference, and, e.g., while omitting or avoiding receiving interference or signals for intra-cell signals or interference. Although, according to an example embodiment, the wireless node may simply obtain or determine a silent resource pattern for one or more signal waveform types, and then, prior to transmission, perform channel sensing during (or on) the silent or unused (e.g., empty or muted) resources (e.g., indicated as unused by at least one node of the cell) of one or more symbols identified by one or more silent resource patterns.

Also, because it may be desirable to provide support for multiple signal waveform types, there may be a silent resource pattern for each of a plurality of signal waveform types, e.g., for a single carrier waveform type and a multi-carrier waveform type. Also, according to an example embodiment, there may be multiple (or a plurality of) silent resource patterns for each of one or more signal waveform types. Also, for example, the sensing wireless node (the node performing channel sensing prior to transmission) may perform channel sensing during silent (or empty or unused or muted) resources within one or more symbols based on a silent resource pattern for one or more signal waveform types.

Figure 2:
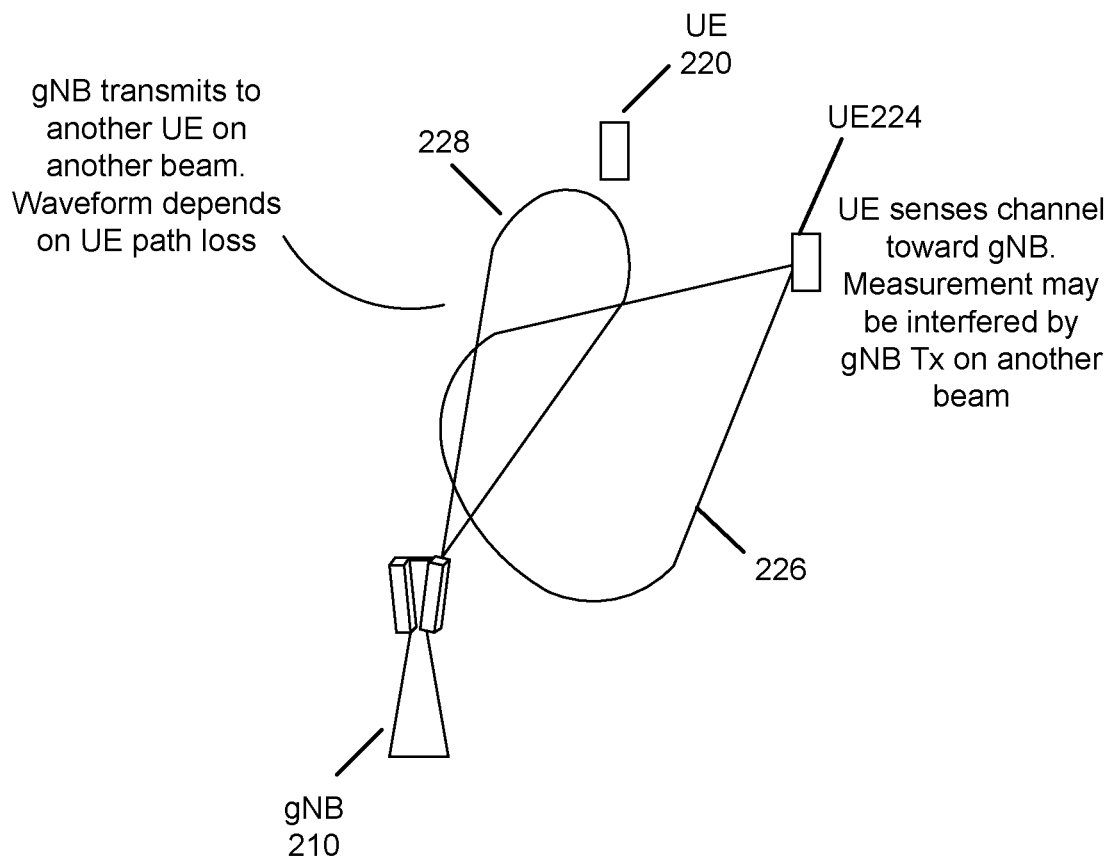
FIG. 2 is a figure illustrating an intra-cell signal that interferes with a sensing wireless node according to an example embodiment.

FIG. 2 is a figure illustrating an intra-cell signal that interferes with a sensing wireless node according to an example embodiment. Within a cell, UE 224 may be planning to transmit a signal to gNB 210 via unlicensed spectrum (unlicensed radio/wireless resources). Thus, UE 224 may need to perform channel sensing or LBT (e.g., using the same beam 226 that UE 224 is planning to use for transmission) before transmitting via beam 226 to gNB 210. Thus, within the cell, UE 224 may perform channel sensing via receive beam 226 towards gNB 210. At the same time, gNB 210 may be transmitting a signal via transmit beam 228 to UE 220. It can be seen that transmit beam 228 at least partially overlaps or partially covers receive beam 226. Thus, the signal transmitted by gNB 210 may be received by UE 224 as an interfering signal, via beams 228, 226 (a beam pair or beam pair link). Thus, the signal transmitted by gNB 210 via beam 228 may be received as intra-cell interference by UE 224, while UE 224 is performing channel sensing. As a result of receiving the intra-cell signal from gNB 210, even if there is no inter-cell interference or inter-RAT interference received by UE 224 via receive beam 226, the detected energy of the channel may typically be greater than a threshold and result in the UE 224 (possibly inaccurately) determining that the channel is occupied (e.g., possibly assuming that the channel is occupied by at least one inter-cell or inter-RAT node). Thus, at least in some example embodiments, this may cause an inaccurate channel sensing, particularly if the channel sensing is determining the amount of energy due to inter-cell and inter-RAT interference, but not intra-cell interference, for example.

Figure 3:
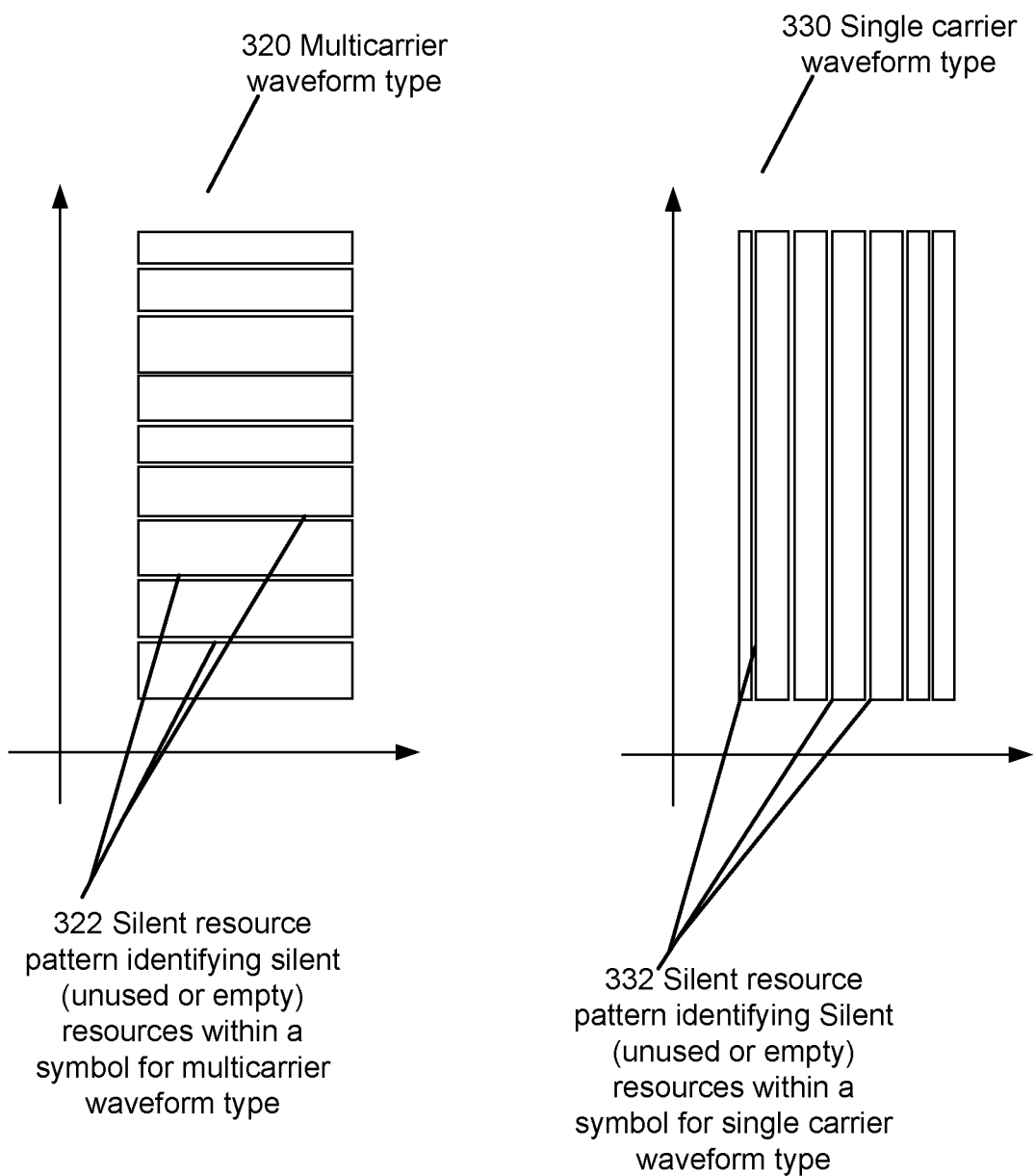
FIG. 3 is a diagram illustrating silent resource patterns for a single carrier waveform type and a multicarrier waveform type according to an example embodiment.

FIG. 3 is a diagram illustrating silent resource patterns for a single carrier waveform type and a multicarrier waveform type according to an example embodiment. According to an example embodiment, in order to support channel sensing for multiple signal waveform types (e.g., such as for a single carrier waveform type and a multicarrier waveform type), a silent resource pattern may be provided or indicate for each of the multiple signal waveform types. As shown in the examples of FIG. 3, a multicarrier waveform type 320 may include a silent resource pattern 322 that identifies silent resources (e.g., unused or empty or muted resources) within a symbol for a multicarrier waveform type. According to an example embodiment, the silent resource pattern 322 for a multicarrier waveform may identify silent (e.g., unused or empty or muted) resources in the frequency domain, such as unused subcarriers of the symbol. Thus, for example, a wireless node may perform channel sensing on one or more of these identified unused or silent subcarriers of this symbol of the multicarrier waveform, in order to perform channel sensing for the multicarrier waveform type.

Likewise, as shown in FIG. 3, a single carrier waveform type 330 may include a silent resource pattern 332 that identifies silent resources (e.g., unused or empty or muted resources) within a symbol for a single carrier waveform type 330. According to an example embodiment, the silent resource pattern 332 for a single carrier waveform may identify silent (e.g., unused or empty or muted) resources in the time domain, such as unused portions or sub-symbols of the symbol. Thus, for example, a wireless node may perform channel sensing on (or during) one or more of these identified unused or silent portions (in time) of this symbol in order to perform channel sensing for the single carrier waveform type.

Therefore, the silent resource pattern(s) may indicate silent or unused (or muted) resource elements (e.g., unused subcarriers in the frequency domain or unused portions or sub-symbols in the time domain) of a symbol, or a group of symbols, and may also indicate the position of the symbol or group of symbols, or of a location of resources provided between symbols of a transmission. According to an example embodiment, the silent resource pattern (e.g., indicating locations of empty resource elements/REs) within a symbol (and/or between symbols of a transmission) may be determined and/or initialized based on a physical layer cell ID (cell ID) to provide randomization of silent resource patterns of cells within a network. In this manner, it may be unlikely that two adjacent or neighbor cells (e.g., NR/5G cells) will have the same or similar silent resource pattern. This is because it may not be desirable for neighbor cells to have a same or very similar silent resource pattern, as this may prevent performing channel sensing to detect inter-cell interference from the neighbor cell during silent resource elements (e.g., since the neighbor cell might also be muted or silent during one or more of such identified silent resources of the cell of the sensing wireless node, if the two cell had the same silent resource pattern).

According to an example embodiment, when a UE is transmitting or receiving via certain beam pair link, the channel sending may be based on or follow the waveform dependent silent resource pattern (e.g., perform channel sensing during silent resources/resource elements identified by the silent resource pattern for that signal waveform type). In these cases, UE channel sensing may be triggered based on aperiodic triggering (e.g., based on data in a transmit buffer awaiting transmission, or based on or in response to receiving control signaling such as control signals received with a DL resource assignment or with an UL resource grant provided to the UE), or based on a periodic trigger. For example, the aperiodic trigger may also select the silent resource pattern to be used in the channel measurement, e.g., control information provided with DL resource assignment or UL resource grant sent to UE may indicate the silent resource pattern to be used for channel sensing or the signal waveform type that should be sensed or for which channel sensing should be performed.

Two example cases are described, when the UE is transmitting or receiving via a beam pair link: 1) For a UE transmitting via a certain beam pair link, the gNB may indicate to the UE which of the REs (resource elements) the UE should leave empty or unused (which may be an example of aperiodic triggering of UL zero power REs), and during which the gNB may perform channel sensing. Such indication can be characterized as aperiodic triggering of silent or zero power (ZP) REs and channel sensing. For example, when the UE transmits a signal, UE may create or include ZP (zero power) or empty REs on the transmitted signal according to the silent resource pattern corresponding to (or for) the signal waveform type of the transmitted signal. 2) For a UE receiving a signal via a certain beam pair link, the gNB may indicate to the UE which of the REs the gNB has left (or will leave) empty (which may be an example of aperiodic triggering of DL ZP REs), and during which the UE shall perform channel sensing. Such indication is an example of aperiodic triggering of ZP REs and channel sensing. Thus, when the UE receives a signal, the UE may detect or measure the energy on one or more of the empty or unused REs based on the silent resource pattern.

For the measurement case when UE is not receiving a transmission (e.g., measures outside of the indicated channel occupancy time (COT)): 1) a silent resource pattern may include one or more symbols, such as a predefined time allocation (e.g., periodical allocation, for example, $n^{th}$ symbol of every $m^{th}$ slot), where the silent resource pattern will be applied or present for channel sensing. And, 2) UE may perform energy detection based silent resource patterns for both the single carrier waveform type and a multicarrier waveform type. From the two detected energy levels (one detected energy value based on each of the silent resource patterns), the wireless node (e.g., UE) may select the smaller (of the two) detected energy value, and may use that smaller detected energy level to determine whether the channel is occupied (e.g., by comparing the smaller detected energy level to the threshold, and determining that the channel is occupied if the lower detected energy level is greater than the threshold), and operates according to that. This may facilitate dynamic waveform selection for the serving gNB (since energy detection based on a wrong or incorrect silent resource pattern may typically indicate that interference is present and channel is occupied, which may not be helpful in a case of unlicensed or shared spectrum between cell and/or between multiple RATs). The UE may indicate the pattern providing the smaller energy level.

Also, for example, the gNB may use the same silent resource patterns when transmitting & receiving data (in other words the silent resource patterns is aligned between gNB and UE for both DL and UL). Based on implementation gNB may use also silent or unused symbol periods for sensing, according to the same or different silent resource patterns.

Figure 4:
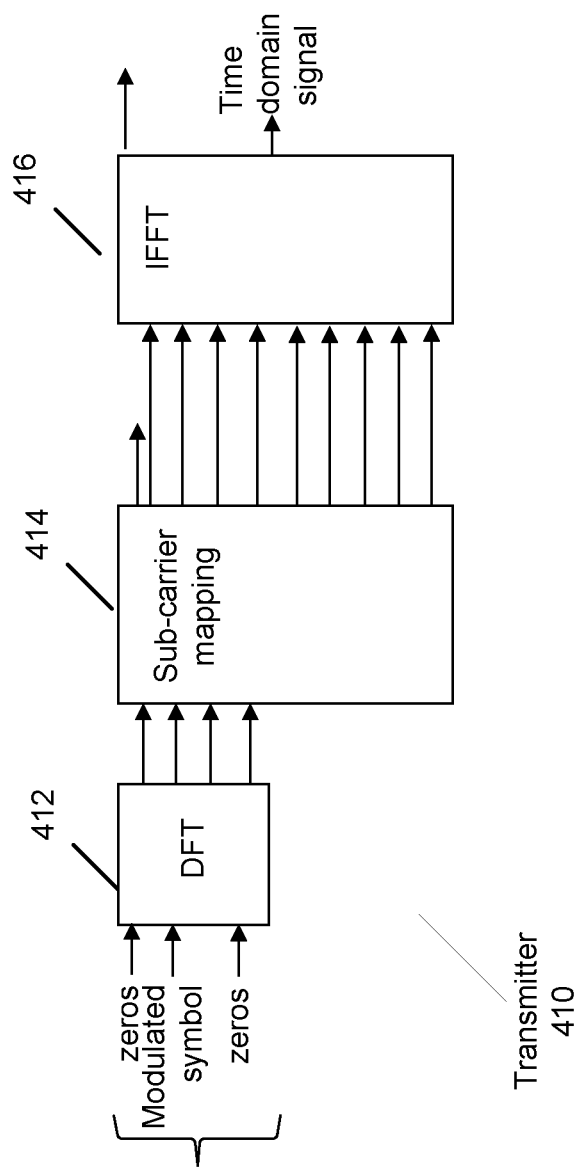
FIG. 4 is a diagram illustrating a single carrier waveform transmitter 410 in which silent or unused resources may be added according to a silent resource pattern.

FIG. 4 is a diagram illustrating a single carrier waveform transmitter 410 in which silent or unused resources may be added according to a silent resource pattern. For example, the silent resource pattern 332 (FIG. 3) may be used to insert or add silent or unused (e.g., empty or muted or zero power) resources within a single carrier waveform transmission for a symbol or group of symbols. An example single carrier transmitter 410 is shown in FIG. 4. For transmitter 410, a specific data pattern may be input to a Discrete Fourier Transform (DFT) block 412, where the data pattern may include some modulated symbols or modulated resource elements, and some zeros or unused or silent resource elements, e.g., based on a silent resource pattern. DFT block 412 performs a Discrete Fourier Transform (DFT) on the sequence of modulated symbols or data pattern, and a subcarrier mapping block 414 maps the outputs of the DFT block 412 to a set of subcarriers, which are input to an Inverse Fast Fourier Transform (IFFT) block 416, which performs an Inverse Fast Fourier on the received set of subcarriers.

According to an example embodiment, the silent resource pattern may depend on the size of physical resource block (PRB) allocation for the single carrier signal. For example, the silent gaps (or unused or empty resources) may be inserted on (or at) predetermined time locations within the symbol (e.g., to the beginning and/or to the end of the symbol). According to an example embodiment, the number of zero elements on the input to the DFT block 412 may scale (e.g., may increase or decrease) with (or based on) the size of Discrete Fourier Transform (DFT) (i.e., size of PRB allocation) at transmitter 410 so that the silent gap (or each of the silent or unused resources within the symbol) may maintain a predetermined minimum duration in time. Thus for example, FIG. 4 illustrates an example single carrier transmitter of single carrier transmitter, where silent gaps or silent resources (unused or empty resources) are provided in time, for example. A multicarrier receiver may likewise include a FFT (Fast Fourier Transform) block to convert the time domain signal to a frequency domain signal, a subcarrier demapping block, and a Inverse FFT or Inverse DFT block, to reverse the process performed at the transmitter 410.

Likewise, for a multicarrier signal waveform transmitter (e.g., for CP-OFDM), a silent resource pattern can be realized in the frequency domain. In other words, certain subcarriers of the symbol are left unused or empty (e.g., the transmitter may apply zeros, or zero power, or empty or muted resources for those indicated subcarriers of the silent resource pattern).

Thus, according to an example embodiment, a wireless node (e.g., UE or gNB) may perform channel sensing at (or on) a specific symbol time via resources (e.g., such as physical resource blocks (PRBs) defined within a bandwidth part (BWP), carrier or LBT sub-band). In an example embodiment, the wireless node may determine, for one or more signal waveform types, a silent resource pattern indicating one or more resource elements as unused (e.g., silent, empty or zero power resources). Thus, if the signal waveform type of a received signal is known, the wireless node may perform channel sensing within one or more resource elements that are indicated as unused by at least one node, based on the silent resource pattern for the (known) signal waveform type of a received signal. The wireless node may determine if the channel is idle, e.g., if the detected energy on the channel (from the channel sensing) is less than a threshold energy level. The wireless node may transmit on the channel if the channel is determined as idle.

If the signal waveform type is not known by the wireless node, then the wireless node may perform channel sensing based on a silent resource pattern for each of a plurality of signal waveform types (e.g., since the signal waveform type of the signal on the channel may be among multiple possible signal waveform types). Thus, for example, the wireless node may perform channel sensing based on a first silent resource pattern associated with a single carrier waveform type, and then may also (e.g., separately) perform channel sensing based on a multi-carrier waveform type (e.g., performing channel sensing during silent resources, as indicated by the different silent resource patterns). According to an example embodiment, a lower (or lowest) detected energy level, from among the multiple channel sensings (each channel sensing using a silent resource pattern associated with a different signal waveform type), may be compared to a threshold energy level, to determine whether the channel is idle. If the channel is determined as idle, then the wireless node may transmit on the channel.

In this manner, according to an example embodiment(s), detection and/or measurement of interference, such as inter-cell and/or inter-RAT interference, on a channel may be improved or made more accurate.

Figure 5:
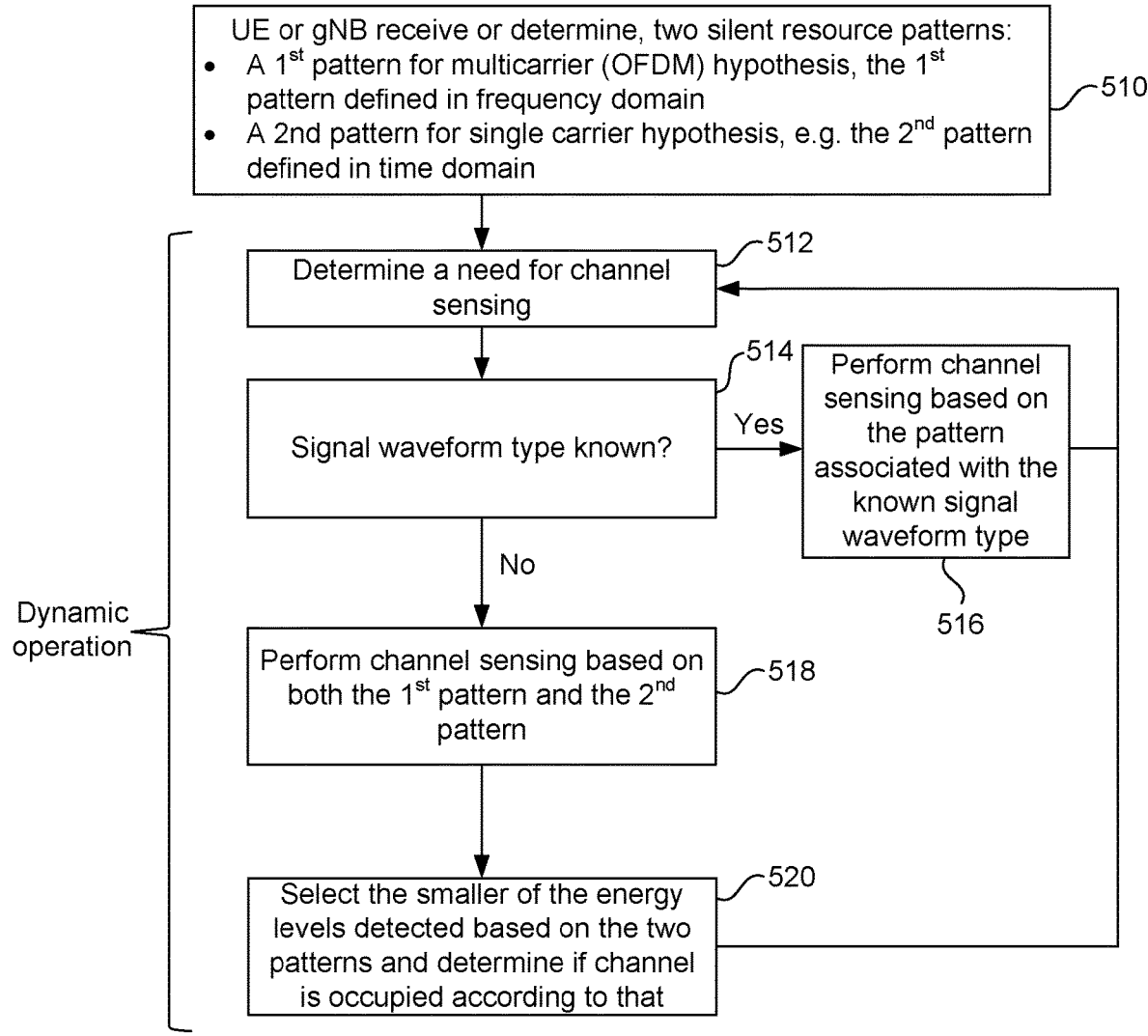
FIG. 5 is a diagram illustrating operation of a wireless node according to an example embodiment.

FIG. 5 is a diagram illustrating operation of a wireless node according to an example embodiment. The flow chart of FIG. 5 may be performed, for example, by a UE (e.g., UE 132 in FIG. 1, or UE 224 in FIG. 2), a gNB (e.g., BS 134 in FIG. 1, or gNB 210 in FIG. 2), or other wireless node. At 510, the wireless node may receive (e.g., from a gNB or from a controlling node/controlling gNB), or may determine (e.g., based on a pre-configuration) a plurality of silent resource patterns, including at least a first silent resource pattern for a multicarrier waveform type, and a second silent resource pattern for a single carrier waveform type. At 512, the node may determine if there is a need for channel sensing. For example, the wireless node may determine if the node has data in buffers to be transmitted. At 514, the wireless node may determine if the signal waveform type for one or more symbols to be sensed is known or determined. If the signal waveform type is known, then at 516, the wireless node may perform channel sensing based on the silent resource pattern for the known signal waveform type (e.g., using either the first silent resource pattern, or the second silent resource pattern). At 518, if the signal waveform type (e.g., for one or more symbols on which channel sensing is to be performed) is not known or determined, then the wireless node performs channel sensing based on the silent resource patterns for both of the signal waveform types (e.g., perform channel sensing based on each of the first silent resource pattern and the second silent resource pattern). The detected energy value is determined based on the channel sensings performed for each of the silent resource patterns. At 520, these two detected channel energy values may be compared, and the lower or smaller detected energy value may be selected, and the node may determine whether the channel is occupied based on the lower or smaller detected energy value. For example, the lower detected energy value may be compared to a threshold, and the channel may be determined as unoccupied, for example, if the lower detected energy value is less than or equal to the threshold. The flow chart or method shown in FIG. 5 may be performed by each of a UE and a gNB, and may be separately performed for DL and UL, since different signal waveform types may be used for UL and DL transmissions.

Some Example Features and Advantages

A silent resource pattern identifying unused or empty (e.g., silent, or muted, or zero power) resources or resource elements are provided, which may facilitate a more accurate channel sensing based on the signal waveform type; a different silent resource pattern may be provided or determined for each of a plurality of signal waveform types, e.g., such as for a single carrier waveform type and a multicarrier signal waveform type. This may allow signal waveform type-specific channel sensing to be performed specifically for or based on a signal waveform type that is used for signal transmission for one or more symbols.

As noted, the signal waveform type may change or vary over time, e.g., a first symbol transmitted within a cell may be transmitted using a first signal waveform type and a second symbol may be transmitted in the cell using a second signal waveform type. Thus, a sending wireless node may perform channel sensing on unused or empty resources of the first symbol using a silent resource pattern of the first signal waveform type, and may perform channel sensing on empty or unused resources of the second symbol based on a silent resource pattern of the second signal waveform type. This may allow more accurate channel sensing, e.g., within a shared spectrum among different cells or different RATs, while supporting multiple signal waveform types. Also, a wireless node may use the silent resource pattern to perform channel sensing if the signal waveform type is known or determined, and may, for example, perform channel sensing based on each of a plurality of silent resource patterns (a silent resource pattern for each of a plurality of signal waveform types) if the specific signal waveform for that symbol where channel sensing will be performed is unknown or not determined by the wireless node.

Configuration with two patterns (multicarrier based and single carrier based).

UE measurement operation under uncertainty related to signal waveform type, both within COT (channel occupancy time) as well as outside COT.

The various techniques may allow a dynamic selection or usage of one of a plurality of signal waveform types for a gNB or other wireless node.

The various techniques may support channel measurements during the COT, which allow for early collision detection and early ending of COT to mitigate collision impact.

Reduced impact from collision may help to allow for longer delay from channel sensing to channel occupancy, relaxing the equipment implementation requirements and reducing the cost.

The various example techniques or embodiments may also avoid "self-interference" in measurements due to gNB transmission and reception via other beams (e.g., intra-cell interference) while allowing for flexible and dynamic use of different signal waveform types.

According to an example embodiment, receiving may mean (or may include) preparing a message or, in the case the apparatus comprises radio parts (e.g., wireless transceiver) or is coupled to them, receiving via a radio path (e.g., antenna and wireless transceiver) as well. Transmitting and/or controlling transmitting may mean or may include preparing a message (e.g., a group of bits, or a packet) for transmission, and then transmitting the message via a wireless transceiver or other apparatus, as an illustrative example. Thus, controlling transmitting may include transmitting.

Figure 6:
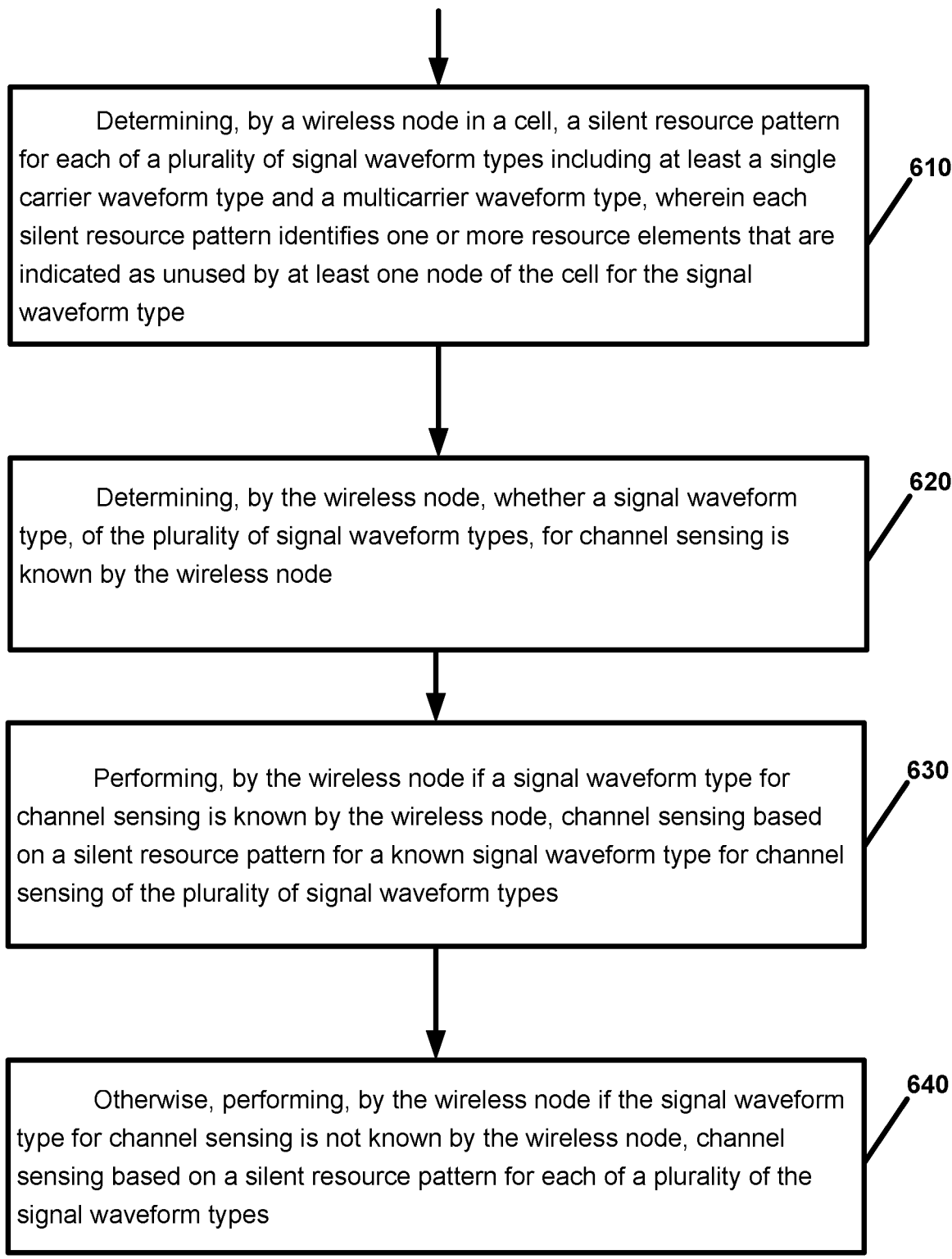
FIG. 6 is a flow chart illustrating operation of a wireless node according to an example embodiment.

Example 1. FIG. 6 is a flow chart illustrating operation of a wireless node (e.g, UE or gNB) according to an example embodiment. Operation 610 includes determining, by a wireless node in a cell, a silent resource pattern for each of a plurality of signal waveform types including at least a single carrier waveform type and a multicarrier waveform type, wherein each silent resource pattern identifies one or more resource elements that are indicated as unused by at least one node of the cell for the signal waveform type. For example, a UE may determine, based on a preconfiguration (a preconfigured or know configuration of silent resources), or a UE may receive control information (e.g., via downlink control information, system information block, and/or radio resource control (RRC) message) from a gNB indicating a silent resource pattern for each of a plurality of signal waveform types. Or, a gNB may receive from a core network or other network node, or may determine based on a received or known configuration, a silent resource pattern for each of a plurality of signal waveform types. According to an example embodiment, the network node may determine a silent resource pattern 322 (FIG. 3) for a multicarrier waveform type 320, and a silent resource pattern 332 for a single carrier waveform type 330 (FIG. 3).

Thus, for example, two signal waveform types may include, e.g., a single carrier waveform type (e.g., which may use a single carrier) and a multicarrier waveform type (e.g., which may include use of multiple carriers). Some example single carrier waveforms may include, e.g., a Single Carrier Frequency Division Multiplexing (SCFDM) waveform, a Cyclic Prefix (CP) Discrete Fourier Transform (DFT)-Spread-Orthogonal Frequency Division Multiplexing (CP DFT-S-OFDM) waveform, and a Zero-Tail DFT-Spread-OFDM waveform (ZT DFT-S-OFDM). Some example multicarrier waveforms may include, e.g., Cyclic Prefix OFDM (CP-OFDM), and unique word (UW) OFDM. These are merely illustrative examples, and other signal waveform types may be used. According to an example embodiment, single carrier signal waveforms and multicarrier signal waveforms may offer different advantages and trade-offs, and thus, may be used for transmission for different channels (e.g., one signal waveform type used for data, and another signal waveform type used for a control channel), or different signal waveform types used to transmit on different symbols or different slots, for example.

With reference to FIG. 6, operation 620 includes determining, by the wireless node, whether a signal waveform type, of the plurality of signal waveform types, for channel sensing is known by the wireless node. The wireless node may use various techniques to determine if a signal waveform type for channel sensing is known by the wireless channel. For example, the wireless node may be configured or preconfigured with (or may receive from another wireless node) information indicating that a particular signal waveform type (e.g., a single carrier waveform, or a multicarrier waveform) should be used for channel sensing, e.g., for a specific time period, for specific resources (e.g., such as for one or more slots, or one or more symbols) or for specific channels (e.g., for a PUSCH data channel, or for a PDCCH channel, or other data or control channel) or for specific signals (such as SRS or CSI-RS). Or, the wireless node may have received control information, e.g., via DCI (downlink control channel) or PDCCH (physical downlink control channel) or a radio resource control (RRC) message or a system information block, or other control information or message) indicating a particular signal waveform type to be used for channel sensing. Or, the wireless channel (e.g., UE) may determine a signal waveform type for channel sensing by determining the signal waveform type of a received signal (e.g., channel sensing may be performed based on a silent resource pattern associated with or for the same signal waveform type as the received signal).

Operation 630 includes performing, by the wireless node if a signal waveform type for channel sensing is known by the wireless node, channel sensing based on a silent resource pattern for a known signal waveform type for channel sensing of the plurality of signal waveform types. Channel sensing may also be referred to as Listen Before Talk (LBT). Channel sensing may include detecting an energy level on a channel (e.g., for one or more symbols or resources, or across a time period), and then comparing the detected energy level to an energy threshold. If the detected energy level is less than the energy threshold, then this may indicate that the channel is Idle (e.g., not in use), and the wireless node may then transmit on the sensed channel. Thus, if the signal waveform type to be used for channel sensing is known, then the wireless node may perform channel sensing during or on or within the resources that are indicated by the silent resource pattern for such known signal waveform type as unused (e.g., silent, or empty or zero power, or low power). In this manner, the wireless node may perform a more accurate channel sensing, while omitting, e.g., some types of interference, such as intra-cell interference. Thus, for example, this technique may provide a more accurate measurement of inter-cell and/or inter-RAT interference level on the sensed channel.

And, with reference to FIG. 6, operation 640 includes otherwise, performing, by the wireless node if the signal waveform type for channel sensing is not known by the wireless node, channel sensing based on a silent resource pattern for each of a plurality of the signal waveform types. Thus, for example, if a signal waveform type is not known by the wireless node for channel sensing, then the wireless node may not know which silent resource pattern should be used for sensing. Thus, if the wrong (incorrect) silent resource pattern is used for channel sensing (e.g., a silent resource pattern used for channel sensing that does not correspond to the signal waveform type for which channel sensing should be performed), this may render the channel sensing results inaccurate. When channel sensing is performed on the wrong or incorrect silent resource pattern, this may cause the channel sensing to be performed on resources that are not necessarily unused or silent. This may cause a channel sensing energy level that may be measured as high (greater than the energy threshold), even though, in some cases, there may be very little energy caused by intercell or inter-RAT interference, which may cause inaccurate results. Thus, according to an example embodiment, the UE may perform (e.g., separately perform) channel sensing using a silent resource pattern for each of a plurality of signal waveform types. For example, the wireless node may perform channel sensing based on (e.g., via unused or silent resources of) a first silent resource pattern for a single carrier waveform type, and then perform channel sensing based on (e.g., via unused or silent resources of) a second silent resource pattern for a multicarrier waveform type. According to an example embodiment, the lower (or lowest) energy level of these multiple sensed energy levels may be for the correct silent resource pattern that should be used (e.g., the silent resource pattern matches or corresponds to the signal waveform type within the cell that should be measured). Thus, in an example embodiment, such lower (or lowest) energy level may be compared to the energy threshold to determine if the channel is idle or not.

Example 2. The method of example 1, wherein the silent resource pattern for each of a plurality of signal waveform types comprises at least: a single carrier silent resource pattern for a single carrier waveform type (e.g., silent resource pattern 332 for single carrier waveform type 330, FIG. 3), wherein the single carrier silent resource pattern identifies resource elements (e.g., which may include times or sub-symbols or resources in the time domain for one or more symbols) that are unused by at least one node of the cell for the single carrier waveform type; and a multicarrier silent resource pattern for a multicarrier waveform type (e.g., a silent resource pattern 322 for multicarrier waveform type 320), wherein the multicarrier silent resource pattern identifies resource elements (e.g., which may include subcarriers or resources in the frequency domain for one or more symbols) that are unused by at least one node of the cell for the multicarrier waveform type. Thus, for example, two general signal waveform types may include, e.g., a single carrier waveform type (e.g., which may use a single carrier) and a multicarrier waveform type (e.g., which may include use of multiple carriers). Some example single carrier waveforms may include, e.g., a Single Carrier Frequency Division Multiplexing (SCFDM) waveform, a Cyclic Prefix (CP) Discrete Fourier Transform (DFT)-Spread-Orthogonal Frequency Division Multiplexing (CP DFT-S-OFDM) waveform, and a Zero-Tail DFT-Spread-OFDM waveform (ZT DFT-S-OFDM). Some example multicarrier waveforms may include, e.g., Cyclic Prefix OFDM (CP-OFDM), and unique word (UW) OFDM. These are merely illustrative examples, and other signal waveform types may be used.

Example 3. The method of example 2: wherein the single carrier silent resource pattern identifies resource elements, in the time domain of one or more symbols, that are unused by at least one node of the cell for the single carrier waveform type; and wherein the multicarrier silent resource pattern identifies resource elements, in the frequency domain of one or more symbols, that are unused by at least one node of the cell for the multicarrier waveform type. Thus, in an example embodiment, a single carrier silent resource pattern for a single carrier waveform type (e.g., silent resource pattern 332 for single carrier waveform type 330, FIG. 3) may identify resource elements (e.g., which may include times or sub-symbols or resources in the time domain for one or more symbols) that are unused by at least one node of the cell for the single carrier waveform type. And, a multicarrier silent resource pattern for a multicarrier waveform type (e.g., a silent resource pattern 322 for multicarrier waveform type 320, FIG. 3) may identify identifies resource elements (e.g., which may include subcarriers or resources in the frequency domain for one or more symbols) that are unused by at least one node of the cell for the multicarrier waveform type.

Example 4. The method of any of examples 1-3 wherein the determining, by the wireless node, whether a signal waveform type, of the plurality of signal waveform types, for channel sensing is known by the wireless node comprises: determining, by the wireless node, whether channel sensing information, including a signal waveform type, of the plurality of signal waveform types, to be used for channel sensing for a at least one symbol, has been signaled or provided to the wireless node. Thus, for example, a UE may determine whether a gNB has signaled or provided (e.g., via one or more control signals) channel sensing information that indicates a signal waveform type to be used for channel sensing, e.g., for one or more symbols.

Example 5. The method of example 4 wherein the channel sensing information includes information identifying a signal waveform type to be used for channel sensing for at least one of a time period, a slot, a channel occupancy time (COT), a transmission time interval (TTI), or a set of symbols. According to an example embodiment, an indicated signal waveform type to be used for channel sensing may be indicated for channel sensing for a specific period of time, or for channel sensing on specific resources (e.g., for one or more symbols, slots or a COT).

Example 6. The method of any of examples 1-5 wherein the performing, by the wireless node if a signal waveform type for channel sensing is known by the wireless node, channel sensing comprises performing a channel sensing during a channel occupancy time (COT). For example, a UE or gNB may perform channel sensing during a channel occupancy time (COT), which may include a time in which another wireless node within a cell may be transmitting or may be occupying the channel.

Example 7. The method of any of examples 1-6, wherein: a single carrier waveform type is used for signal transmissions for a first symbol, and wherein the performing channel sensing comprises performing channel sensing, by the wireless node, within the first symbol using a silent resource pattern for the single carrier waveform type; and a multicarrier waveform type is used for signal transmissions for a second symbol, and wherein the performing channel sensing comprises performing channel sensing, by the wireless node within the second symbol using a silent resource pattern for the multicarrier waveform type. According to an example embodiment, channel sensing for different symbols may be based on different signal waveform types. For example, another wireless node, or different wireless nodes within a cell, may transmit signals or data using different signal waveform types. For example, a wireless node may transmit a first symbol using a single carrier waveform type, and may transmit a second (subsequent) symbol via a multicarrier waveform type. Or, a first wireless node may transmit a first symbol via a single carrier waveform type, and a second (different) wireless node may transmit a second symbol via a multicarrier waveform type. Thus, for example, to correctly perform channel measurement using a silent resource pattern that matches or is associated with the intracell transmitted data or signal, the wireless node may need to switch silent resource patterns for sensing for different symbols, or the wireless node may perform channel sensing on different nodes using silent resource patterns associated with different signal waveform types.

Example 8. The method of any of examples 1-7, wherein the performing channel sensing based on a silent resource pattern for each of a plurality of the signal waveform types comprises the following if the signal waveform type is not known: determining a detected energy level from the channel sensing for each of the plurality of the signal waveform types; determining a lowest detected energy level from the channel sensing for the plurality of the signal waveform types; comparing the lowest detected energy level to a threshold; determining whether a channel is occupied or unoccupied based on the comparing. Thus, for example, if a signal waveform type is not known by the wireless node for channel sensing, then the wireless node may not know which silent resource pattern should be used for channel sensing. Thus, if the wrong (incorrect) silent resource pattern is used for channel sensing, this may render the channel sensing results inaccurate. When channel sensing is performed on the wrong or incorrect silent resource pattern, this may cause the channel sensing to be performed on resources that are not necessarily unused or silent. This may cause a channel sensing energy level that may be high (greater than the energy threshold), even though, in some cases, there may be very little energy caused by intercell or inter-RAT interference, which may cause inaccurate results. Thus, according to an example embodiment, the UE may perform (e.g., separately perform) channel sensing using a silent resource pattern for each of a plurality of signal waveform types. For example, the wireless node may perform channel sensing based on (e.g., via unused or silent resources of) a first silent resource pattern for a single carrier waveform type, and then perform channel sensing based on (e.g., via unused or silent resources of) a second silent resource pattern for a multicarrier waveform type. According to an example embodiment, the lower (or lowest) energy level of these multiple sensed energy levels may be for the correct silent resource pattern that should be used (e.g., the silent resource pattern matches or corresponds to the signal waveform type within the cell that should be measured). Thus, in an example embodiment, such lower (or lowest) energy level may be compared to the energy threshold to determine if the channel is idle or not.

Example 9. The method of any of examples 1-8, wherein the silent resource pattern for each of the plurality of signal waveform types is cell-specific or base station-specific. For example, each gNB or cell may have its own specific set of one or more silent resource patterns. Thus, for example, a first silent resource pattern for a single carrier waveform type may be used for channel sensing within a first cell or for a first gNB, while a second silent resource pattern for a single carrier waveform type may be used for channel sensing within a second cell or for a second gNB.

Example 10. The method of any of examples 1-9 wherein the signal waveform type for channel sensing is known by the wireless node for a time period if the wireless node is transmitting or receiving within the time period. For example, if a wireless node is transmitting, the wireless node the signal waveform type of the signal to be transmitted. Thus, for example, if a wireless node is transmitting, via on a signal waveform type, within a cell for one or more symbols, then the wireless node may use the silent resource pattern associated with or for that signal waveform type within indicated unused resources (according to the associated silent resource pattern) within those one or more symbols. Likewise, if the wireless node is receiving a signal, the wireless node knows the signal waveform type used for the received signal. Thus, the wireless node may use the silent resource pattern associated with or for that signal waveform type (of the received signal) within indicated unused resources (according to the associated silent resource pattern) within those one or more symbols.

Example 11. The method of any of examples 1-10, further comprising the wireless node performing at least one of the following if channel sensing indicates a channel is occupied: not transmitting, based on the occupied channel (e.g., the wireless node may not transmit on the channel if the channel sensing indicates the channel is busy); transmitting a signal on the channel using reduced transmission power or a reduced transmission duration based on the occupied channel (e.g., this reduced power transmission and/or duration may decrease the likelihood that such transmission will cause interference with another wireless node that may be currently occupying or using the channel); sending a message to another wireless node to report that the channel is occupied; or performing a backoff for a period of time, and then performing channel sensing again to determine if the channel is occupied (e.g., to allow the wireless node to wait, and then try again to perform channel sensing and transmit if the channel is idle or unoccupied).

Example 12. The method of any of examples 1-11, wherein the wireless node comprises one of: a user equipment; or a gNB or base station.

Example 13. An apparatus comprising means (e.g., wireless node 1000, and/or one or more of RF transceiver 1002A and/or 1002B, controller 1008, processor 1004, and/or memory 1006, FIG. 8) for performing the method of any of examples 1-12.

Example 14. A non-transitory computer-readable storage medium (e.g., 1006) comprising instructions stored thereon that, when executed by at least one processor (e.g., processor 1004), are configured to cause a computing system (e.g., wireless node 1000) to perform the method of any of examples 1-12.

Example 15. An apparatus (e.g., 1000) comprising: at least one processor (e.g., 1004, FIG. 8); and at least one memory (e.g., 1006, FIG. 8) including computer program code; the at least one memory and the computer program code configured to, with the at least one processor, cause the apparatus (e.g., 1000) at least to perform the method of any of examples 1-12.

Example 16. An apparatus (e.g., 1000) comprising: at least one processor (e.g., 1004, FIG. 8); and at least one memory (e.g., 1006, FIG. 8) including computer program code; the at least one memory and the computer program code configured to, with the at least one processor, cause the apparatus at least to: determine, by a wireless node in a cell, a silent resource pattern for each of a plurality of signal waveform types including at least a single carrier waveform type and a multicarrier waveform type, wherein each silent resource pattern identifies one or more resource elements that are indicated as unused by at least one node of the cell for the signal waveform type; determine, by the wireless node, whether a signal waveform type, of the plurality of signal waveform types, for channel sensing is known by the wireless node; perform, by the wireless node if a signal waveform type for channel sensing is known by the wireless node, channel sensing based on a silent resource pattern for a known signal waveform type for channel sensing of the plurality of signal waveform types; otherwise, perform, by the wireless node if the signal waveform type for channel sensing is not known by the wireless node, channel sensing based on a silent resource pattern for each of a plurality of the signal waveform types. For further illustrative details and/or example embodiments related to Examples 16-36, please see the illustrative details and/or illustrative example embodiments described with reference to Examples 1-11.

Example 17. The apparatus of example 16, wherein the silent resource pattern for each of a plurality of signal waveform types comprises at least: a single carrier silent resource pattern for a single carrier waveform type, wherein the single carrier silent resource pattern identifies resource elements that are unused by at least one node of the cell for the single carrier waveform type; and a multicarrier silent resource pattern for a multicarrier waveform type, wherein the multicarrier silent resource pattern identifies resource elements that are unused by at least one node of the cell for the multicarrier waveform type.

Example 18. The apparatus of example 17: wherein the single carrier silent resource pattern identifies resource elements, in the time domain of one or more symbols, that are unused by at least one node of the cell for the single carrier waveform type; and wherein the multicarrier silent resource pattern identifies resource elements, in the frequency domain of one or more symbols, that are unused by at least one node of the cell for the multicarrier waveform type.

Example 19. The apparatus of any of examples 16-18 wherein the apparatus being caused to determine, by the wireless node, whether a signal waveform type, of the plurality of signal waveform types, for channel sensing is known by the wireless node comprises the apparatus being caused to: determine, by the wireless node, whether channel sensing information, including a signal waveform type, of the plurality of signal waveform types, to be used for channel sensing for at least one symbol, has been signaled or provided to the wireless node.

Example 20. The apparatus of any of examples 16-19, wherein the apparatus being caused to perform channel sensing based on a silent resource pattern for each of a plurality of the signal waveform types comprises the apparatus being caused to perform the following if the signal waveform type is not known: determine a detected energy level from the channel sensing for each of the plurality of the signal waveform types; determine a lowest detected energy level from the channel sensing for the plurality of the signal waveform types; compare the lowest detected energy level to a threshold; and determine whether a channel is occupied or unoccupied based on the comparing.

Example 21. The apparatus of any of examples 16-20, wherein the silent resource pattern for each of the plurality of signal waveform types is cell-specific or base station-specific.

Example 22. The apparatus of any of examples 16-21 wherein the signal waveform type for channel sensing is known by the wireless node for a time period if the wireless node is transmitting or receiving within the time period.

Example 23. The apparatus of any of examples 16-22, further comprising the apparatus being caused to perform at least one of the following if channel sensing indicates a channel is occupied: not transmit, based on the occupied channel; transmit a signal on the channel using reduced transmission power or a reduced transmission duration based on the occupied channel; send a message to another wireless node to report that the channel is occupied; or perform a backoff for a period of time, and then performing channel sensing again to determine if the channel is occupied.

Example 24. The apparatus of any of examples 16-23, wherein the wireless node comprises one of: a user equipment; or a gNB or base station.

Example 25. The method of any of examples 1-12 wherein the determining, by the wireless node, whether a signal waveform type, of the plurality of signal waveform types, for channel sensing is known by the wireless node comprises at least one of the following: determining, by the wireless node, whether the wireless node has been preconfigured with information indicating a signal waveform type, of the plurality of signal waveform types, to be used for channel sensing; determining, by the wireless node, whether the wireless node has received control information indicating a signal waveform type, of the plurality of signal waveform types, to be used for channel sensing; determining, by the wireless node, whether the wireless node has received control information, associated with an uplink resource grant for an uplink transmission from the wireless node or associated with a downlink resource allocation for a downlink transmission to the wireless node, indicating a signal waveform type, of the plurality of signal waveform types, to be used for the uplink or downlink transmission, wherein channel sensing is performed by the wireless node using the silent resource pattern for the signal waveform type indicated for the uplink transmission by the wireless node or indicated for the downlink transmission to the wireless node; and determining, by the wireless node, whether the wireless node has received control information, associated with a downlink resource allocation for a downlink transmission, indicating a signal waveform type, of the plurality of signal waveform types, to be used for the downlink transmission, wherein channel sensing is performed by the wireless node during the downlink transmission based on the silent resource pattern for the indicated signal waveform type.

Example 26. The method of any of examples 1-12, further comprising: receiving, by the wireless node, information identifying one or more symbols on which channel sensing should be performed; receiving information indicating a signal waveform type for each of the one or more symbols, and wherein performing channel sensing comprises performing channel sensing within each of the one or more symbols using a silent resource pattern for the signal waveform type for each of the one or more symbols.

Example 27. The method of any of examples 1-12 wherein the performing channel sensing comprises: detecting an energy level of a channel for the one or more resource elements that are indicated as unused by at least one node of the cell for the signal waveform type; comparing the detected energy level to a threshold; determining whether the channel is occupied or unoccupied based on the comparing.

Example 28. The method of any of examples 1-12, further comprising: receiving, by the wireless node, an uplink scheduling grant for an uplink transmission; performing the following if the signal waveform type for channel sensing is known by the wireless node: transmitting, by the wireless node, a signal via resources indicated by the uplink scheduling grant if the channel sensing indicates that the channel is unoccupied.

Example 29. The method of any of examples 1-12, further comprising: receiving, by the wireless node, an uplink scheduling grant for an uplink transmission; performing the following if the signal waveform type for channel sensing is not known by the wireless node: transmitting, by the wireless node, a signal via resources indicated by the uplink scheduling grant if the channel sensing indicates that the channel is unoccupied.

Figure 7:
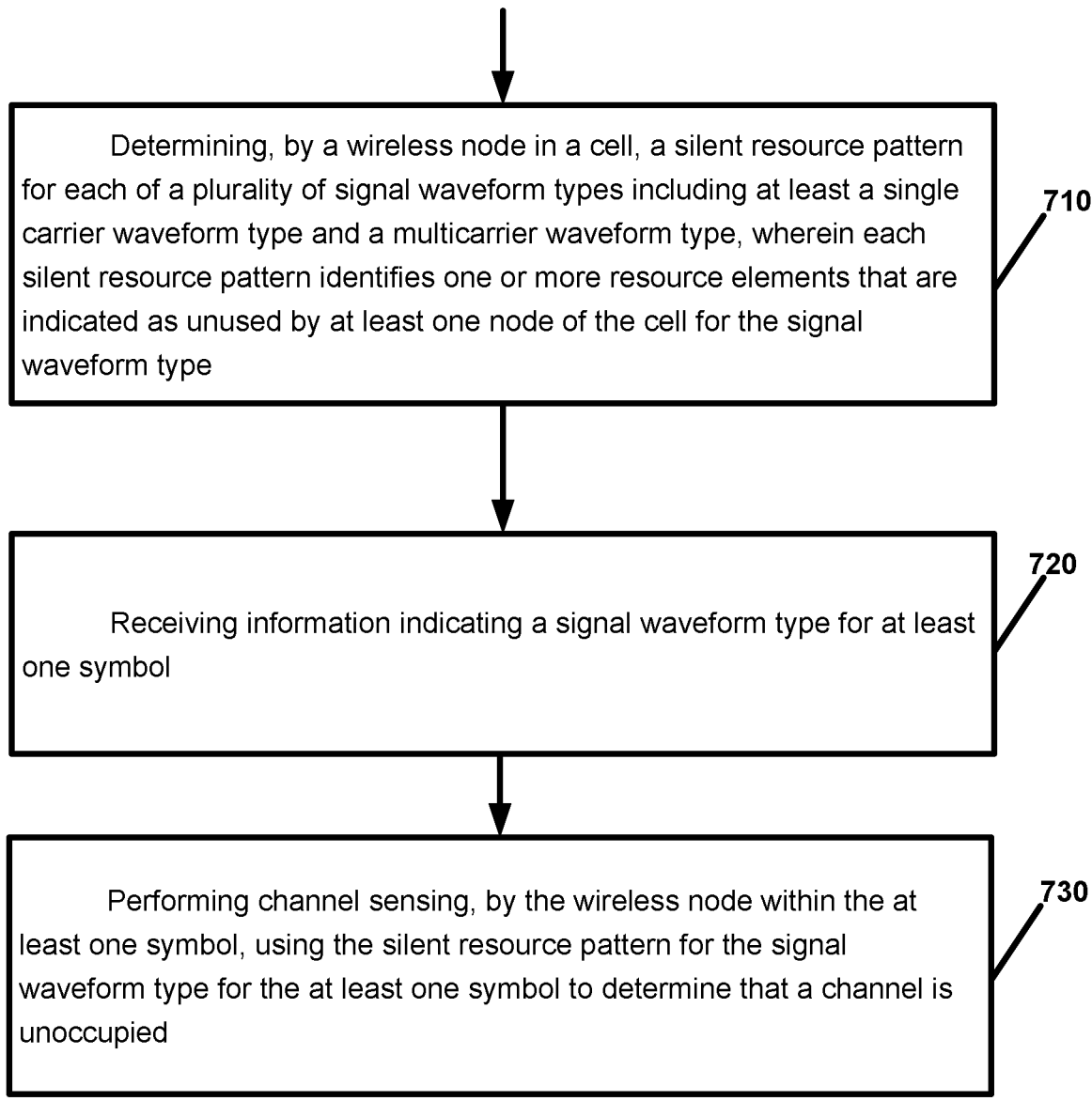
FIG. 7 is a flow chart illustrating operation of a wireless node according to an example embodiment.

Example 30. FIG. 7 is a flow chart illustrating operation of a wireless node (e.g., UE or gNB) according to an example embodiment. Operation 710 includes determining, by a wireless node in a cell, a silent resource pattern for each of a plurality of signal waveform types including at least a single carrier waveform type and a multicarrier waveform type, wherein each silent resource pattern identifies one or more resource elements that are indicated as unused by at least one node of the cell for the signal waveform type. Operation 720 includes receiving information indicating a signal waveform type for at least one symbol. And, operation 730 includes performing channel sensing, by the wireless node within the at least one symbol, using the silent resource pattern for the signal waveform type for the at least one symbol to determine that a channel is unoccupied.

Example 31. The method of claim 30, further comprising: transmitting a signal by the wireless node based on the channel being unoccupied.

Example 32. The method of any of examples 30-31, comprising: determining that a signal waveform type is not indicated to the wireless node or not known by the wireless node for another symbol; and performing channel sensing, by the wireless node, based on both a silent resource pattern for the single carrier waveform type and a silent resource pattern for the multicarrier waveform type, within the another symbol.

Example 33. The method of any of examples 30-32, wherein information indicating a signal waveform type for at least one symbol comprises: information indicating a single carrier waveform type for a first symbol, and wherein the performing channel sensing comprises performing channel sensing, by the wireless node, within the first symbol using a silent resource pattern for the single carrier waveform type; and information indicating a multicarrier waveform type for a second symbol, and wherein the performing channel sensing comprises performing channel sensing, by the wireless node within the second symbol using a silent resource pattern for the multicarrier waveform type.

Example 34. The method of any of examples 30-33, wherein the silent resource pattern for each of the plurality of signal waveform types is cell-specific or base station-specific.

Example 35. The method of any of examples 30-34, wherein the wireless node comprises one of: a user equipment; or a gNB or base station.

Example 36. The method of any of examples 30-35, wherein the receiving information indicating a signal waveform type for each of the one or more symbols comprises one or more of the following: receiving, by the wireless node, control information indicating a signal waveform type, of the plurality of signal waveform types, for each of the one or more symbols; receiving control information, associated with an uplink resource grant for an uplink transmission from the wireless node or associated with a downlink resource allocation for a downlink transmission to the wireless node, indicating a signal waveform type, of the plurality of signal waveform types, of each of the one or more symbols; or receiving, by the wireless, a signal of a signal waveform type.

Example 37. An apparatus comprising means (e.g., wireless node 1000, and/or one or more of RF transceiver 1002A and/or 1002B, controller 1008, processor 1004, and/or memory 1006, FIG. 8) for performing the method of any of examples 30-36.

Example 38. A non-transitory computer-readable storage medium (e.g., 1006) comprising instructions stored thereon that, when executed by at least one processor (e.g., 1004, FIG. 8), are configured to cause a computing system to perform the method of any of examples 30-36.

Example 39. An apparatus comprising: at least one processor (e.g., 1004, FIG. 8); and at least one memory (e.g., 1006, FIG. 8) including computer program code; the at least one memory and the computer program code configured to, with the at least one processor, cause the apparatus at least to perform the method of any of examples 30-36.

Figure 8:
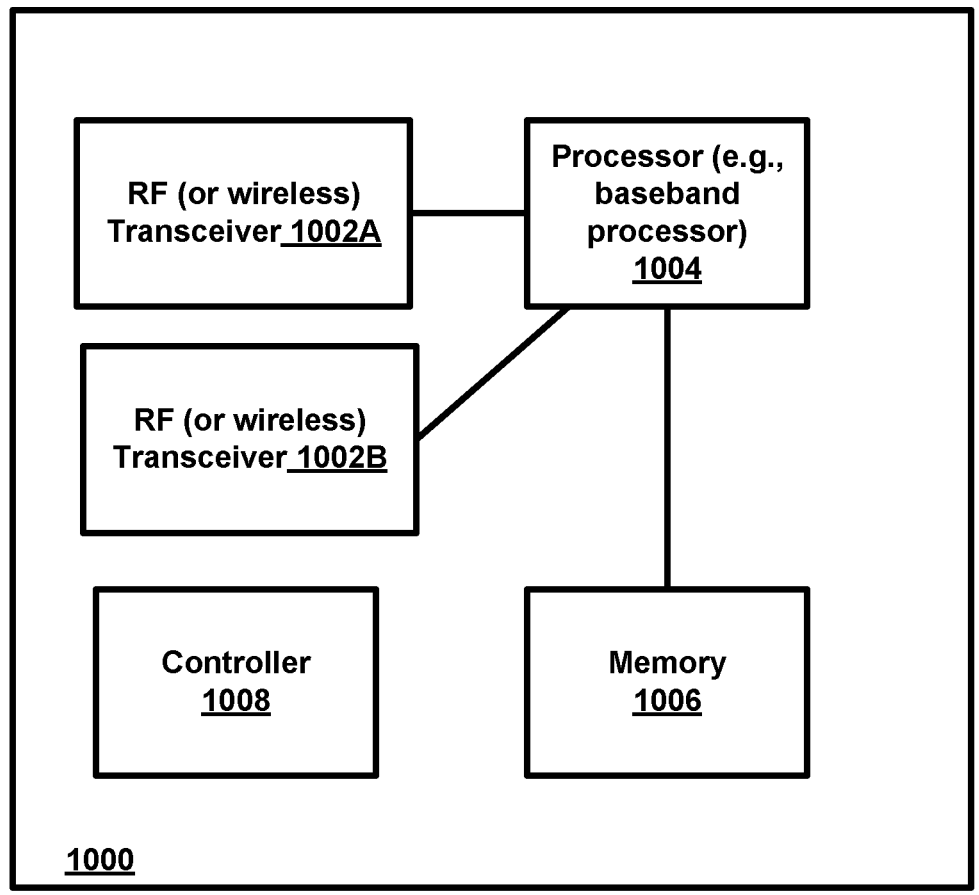
FIG. 8 is a block diagram of a wireless node or wireless station (e.g., AP, BS or user device/UE, gNB, eNB, or other network node) 1000 according to an example embodiment.

FIG. 8 is a block diagram of a wireless node or wireless station (e.g., AP, BS or user device/UE, gNB, eNB, or other network node) 1000 according to an example embodiment. The wireless station 1000 may include, for example, one or more (e.g., two as shown in FIG. 8) RF (radio frequency) or wireless transceivers 1002A, 1002B, where each wireless transceiver includes a transmitter to transmit signals and a receiver to receive signals. The wireless station also includes a processor or control unit/entity (controller) 1004 to execute instructions or software and control transmission and receptions of signals, and a memory 1006 to store data and/or instructions.

Processor 1004 may also make decisions or determinations, generate frames, packets or messages for transmission, decode received frames or messages for further processing, and other tasks or functions described herein. Processor 1004, which may be a baseband processor, for example, may generate messages, packets, frames or other signals for transmission via wireless transceiver 1002 (1002A or 1002B). Processor 1004 may control transmission of signals or messages over a wireless network, and may control the reception of signals or messages, etc., via a wireless network (e.g., after being down-converted by wireless transceiver 1002, for example). Processor 1004 may be programmable and capable of executing software or other instructions stored in memory or on other computer media to perform the various tasks and functions described above, such as one or more of the tasks or methods described above. Processor 1004 may be (or may include), for example, hardware, programmable logic, a programmable processor that executes software or firmware, and/or any combination of these. Using other terminology, processor 1004 and transceiver 1002 together may be considered as a wireless transmitter/receiver system, for example.

In addition, referring to FIG. 8, a controller (or processor) 1008 may execute software and instructions, and may provide overall control for the station 1000, and may provide control for other systems not shown in FIG. 8, such as controlling input/output devices (e.g., display, keypad), and/or may execute software for one or more applications that may be provided on wireless station 1000, such as, for example, an email program, audio/video applications, a word processor, a Voice over IP application, or other application or software.

In addition, a storage medium may be provided that includes stored instructions, which when executed by a controller or processor may result in the processor 1004, or other controller or processor, performing one or more of the functions or tasks described above.

According to another example embodiment, RF or wireless transceiver(s) 1002A/1002B may receive signals or data and/or transmit or send signals or data. Processor 1004 (and possibly transceivers 1002A/1002B) may control the RF or wireless transceiver 1002A or 1002B to receive, send, broadcast or transmit signals or data.

The embodiments are not, however, restricted to the system that is given as an example, but a person skilled in the art may apply the solution to other communication systems. Another example of a suitable communications system is the 5G system. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
    determining, by a wireless node in a cell, a silent resource pattern for each of a plurality of signal waveform types including at least a single carrier waveform type and a multicarrier waveform type, wherein each silent resource pattern identifies one or more resource elements that are indicated as unused by at least one node of the cell for the signal waveform type;
    determining, by the wireless node, whether a signal waveform type, of the plurality of signal waveform types, for channel sensing is known by the wireless node;
    performing, by the wireless node if a signal waveform type for channel sensing is known by the wireless node, channel sensing based on a silent resource pattern for a known signal waveform type for channel sensing of the plurality of signal waveform types;
    otherwise, performing, by the wireless node if the signal waveform type for channel sensing is not known by the wireless node, channel sensing based on a silent resource pattern for each of a plurality of the signal waveform types.

2. The method of claim 1, wherein the silent resource pattern for each of a plurality of signal waveform types comprises at least:
    a single carrier silent resource pattern for a single carrier waveform type, wherein the single carrier silent resource pattern identifies resource elements that are unused by at least one node of the cell for the single carrier waveform type; and
    a multicarrier silent resource pattern for a multicarrier waveform type, wherein the multicarrier silent resource pattern identifies resource elements that are unused by at least one node of the cell for the multicarrier waveform type.

3. The method of claim 1, wherein the determining, by the wireless node, whether a signal waveform type, of the plurality of signal waveform types, for channel sensing is known by the wireless node comprises:
    determining, by the wireless node, whether channel sensing information, including a signal waveform type, of the plurality of signal waveform types, to be used for channel sensing for at least one symbol, has been signaled or provided to the wireless node.

4. The method of claim 1, wherein the performing, by the wireless node if a signal waveform type for channel sensing is known by the wireless node, channel sensing comprises performing a channel sensing during a channel occupancy time (COT).

5. The method of claim 1, wherein the performing channel sensing based on a silent resource pattern for each of a plurality of the signal waveform types comprises the following if the signal waveform type is not known:
    determining a detected energy level from the channel sensing for each of the plurality of the signal waveform types;
    determining a lowest detected energy level from the channel sensing for the plurality of the signal waveform types;
    comparing the lowest detected energy level to a threshold;
    determining whether a channel is occupied or unoccupied based on the comparing.

6. The method of claim 1, wherein the silent resource pattern for each of the plurality of signal waveform types is cell-specific or base station-specific.

7. The method of claim 1, wherein the signal waveform type for channel sensing is known by the wireless node for a time period if the wireless node is transmitting or receiving within the time period.

8. The method of claim 1, further comprising the wireless node performing at least one of the following if channel sensing indicates a channel is occupied:
    not transmitting, based on the occupied channel;
    transmitting a signal on the channel using reduced transmission power or a reduced transmission duration based on the occupied channel;
    sending a message to another wireless node to report that the channel is occupied; or
    performing a backoff for a period of time, and then performing channel sensing again to determine if the channel is occupied.

9. The method of claim 1, where the wireless node is a user equipment, and wherein the UE will be transmitting a signal via a beam pair link, the method comprising:
    transmitting, by the user equipment, a silent resource pattern identifying resource elements that the user equipment should leave empty or unused, and during which the gNB may perform channel sensing.

10. The method of claim 1, where the wireless node is a user equipment, and wherein the user equipment will be receiving a signal via a beam pair link, the method comprising:
    receiving, by the user equipment, a silent resource pattern identifying resource elements that the gNB will leave empty or unused, and during which the user equipment will perform channel sensing.

11. An apparatus comprising:
    at least one processor; and
    at least one memory including computer program code;
    the at least one memory and the computer program code configured to, with the at least one processor, cause the apparatus at least to:
    determine, by a wireless node in a cell, a silent resource pattern for each of a plurality of signal waveform types including at least a single carrier waveform type and a multicarrier waveform type, wherein each silent resource pattern identifies one or more resource elements that are indicated as unused by at least one node of the cell for the signal waveform type;
    determine, by the wireless node, whether a signal waveform type, of the plurality of signal waveform types, for channel sensing is known by the wireless node;
    perform, by the wireless node if a signal waveform type for channel sensing is known by the wireless node, channel sensing based on a silent resource pattern for a known signal waveform type for channel sensing of the plurality of signal waveform types;

otherwise, perform, by the wireless node if the signal waveform type for channel sensing is not known by the wireless node, channel sensing based on a silent resource pattern for each of a plurality of the signal waveform types.

12. The apparatus of claim 11, wherein the silent resource pattern for each of a plurality of signal waveform types comprises at least:

a single carrier silent resource pattern for a single carrier waveform type, wherein the single carrier silent resource pattern identifies resource elements that are unused by at least one node of the cell for the single carrier waveform type; and a multicarrier silent resource pattern for a multicarrier waveform type, wherein the multicarrier silent resource pattern identifies resource elements that are unused by at least one node of the cell for the multicarrier waveform type.

13. The apparatus of claim 11, wherein the apparatus being caused to determine, by the wireless node, whether a signal waveform type, of the plurality of signal waveform types, for channel sensing is known by the wireless node comprises the apparatus being caused to:

determine, by the wireless node, whether channel sensing information, including a signal waveform type, of the plurality of signal waveform types, to be used for channel sensing for at least one symbol, has been signaled or provided to the wireless node.

14. The apparatus of claim 11, wherein the apparatus being caused to perform channel sensing based on a silent resource pattern for each of a plurality of the signal waveform types comprises the apparatus being caused to perform the following if the signal waveform type is not known:

determine a detected energy level from the channel sensing for each of the plurality of the signal waveform types;

determine a lowest detected energy level from the channel sensing for the plurality of the signal waveform types;

compare the lowest detected energy level to a threshold; and determine whether a channel is occupied or unoccupied based on the comparing.

15. The apparatus of claim 11, wherein the silent resource pattern for each of the plurality of signal waveform types is cell-specific or base station-specific.

16. The apparatus of claim 11, wherein the signal waveform type for channel sensing is known by the wireless node for a time period if the wireless node is transmitting or receiving within the time period.

17. The apparatus of claim 11, further comprising the apparatus being caused to perform at least one of the following if channel sensing indicates a channel is occupied:

not transmit, based on the occupied channel;

transmit a signal on the channel using reduced transmission power or a reduced transmission duration based on the occupied channel;

send a message to another wireless node to report that the channel is occupied; or perform a backoff for a period of time, and then performing channel sensing again to determine if the channel is occupied.

18. The apparatus of claim 11, wherein the wireless node is a user equipment being caused to transmit a signal via a beam pair link, comprising the apparatus being caused to:

transmit, by the user equipment, a silent resource pattern identifying resource elements that the user equipment should leave empty or unused, and during which the gNB may perform channel sensing.

19. The apparatus of claim 11, wherein the wireless node is a user equipment, being caused to receive a signal via a beam pair link, comprising the apparatus being caused to:

receive, by the user equipment, a silent resource pattern identifying resource elements that the gNB will leave empty or unused, and during which the user equipment will perform channel sensing.

* * * * *